US012568327B2

(12) United States Patent
Hutchings et al.

(10) Patent No.: US 12,568,327 B2
(45) Date of Patent: Mar. 3, 2026

(54) PORTABLE ELECTRONIC ACCESSORY SYSTEMS AND RELATED DEVICES

(71) Applicant: Skullcandy, Inc., Park City, UT (US)

(72) Inventors: Jeff Hutchings, Lehi, UT (US); Nikolaj Hviid, Stockdorf (DE)

(73) Assignee: Skullcandy, Inc., Park City, UT (US)

( * ) Notice: Subject to any disclaimer, the term of this patent is extended or adjusted under 35 U.S.C. 154(b) by 767 days.

(21) Appl. No.: 17/247,624

(22) Filed: Dec. 18, 2020

(65) Prior Publication Data

US 2022/0201380 A1 Jun. 23, 2022

(51) Int. Cl.
*H04R 1/10* (2006.01)
*G06F 3/16* (2006.01)
(Continued)

(52) U.S. Cl.
CPC ........... *H04R 1/1041* (2013.01); *G06F 3/162* (2013.01); *H01Q 1/241* (2013.01); *H02J 7/0045* (2013.01); *H04B 1/385* (2013.01); *H04M 1/6041* (2013.01); *H04R 1/1025* (2013.01); *H04R 5/033* (2013.01); *H04B 2001/3866* (2013.01); *H04R 2420/07* (2013.01)

(58) Field of Classification Search
CPC .... H04R 1/1041; H04R 1/1025; H04R 5/033; H04R 2420/07; G06F 3/162; H01Q 1/241; H02J 7/0045; H04B 1/385; H04B 2001/3866; H04M 1/6041
See application file for complete search history.

(56) References Cited

U.S. PATENT DOCUMENTS 10,798,210 B2 10/2020 Matus et al.
10,826,862 B1 11/2020 Suprasadachandran et al.
(Continued)

FOREIGN PATENT DOCUMENTS

DE 202006017795 U1 4/2007

OTHER PUBLICATIONS

English Translation of CN 111031433 (Year: 2020).*
(Continued)

*Primary Examiner* — Patrick N Edouard
*Assistant Examiner* — Eboni N Giles
(74) *Attorney, Agent, or Firm* — Ruggiero McAllister & McMahon LLC

(57) ABSTRACT

Portable electronic accessories and removable control packages are disclosed. A portable electronic accessory includes a battery configured to provide battery power, a control socket configured to receive a removable control package, and power circuitry configured to deliver at least a portion of the battery power to the removable control package to power the removable control package. The removable control package is configured to control operation of the portable electronic accessory. A removable control package includes input/output (I/O) pins, and one or more communication radio circuits. The I/O pins are configured to interface with pins of the control socket, electrically connect to the pins of the control socket when the removable control package is received into the control socket, and receive battery power from the battery of the portable electronic accessory. The one or more communication radio circuits are configured to provide wireless communication capabilities to the portable electronic accessory.

19 Claims, 5 Drawing Sheets

(51) Int. Cl.

| | |
|---|---|
| *H01Q 1/24* | (2006.01) |
| *H02J 7/00* | (2006.01) |
| *H04B 1/3827* | (2015.01) |
| *H04M 1/60* | (2006.01) |
| *H04R 1/1025* | (2026.01) |
| *H04R 5/033* | (2006.01) |

(56)                  References Cited

U.S. PATENT DOCUMENTS

| | | | |
|---|---|---|---|
| 2010/0041363 A1* | 2/2010 | Griffin, Jr. ............. | H04B 1/088 |
| | | | 455/344 |
| 2014/0122720 A1 | 5/2014 | Jung et al. | |
| 2014/0161301 A1 | 6/2014 | Merenda | |
| 2015/0110315 A1 | 4/2015 | Callias et al. | |
| 2017/0064433 A1* | 3/2017 | Hirsch ................... | H04R 1/028 |
| 2019/0007540 A1 | 1/2019 | Shaik et al. | |
| 2019/0207777 A1 | 7/2019 | Patel et al. | |
| 2020/0104194 A1 | 4/2020 | Chalmers et al. | |
| 2020/0142667 A1 | 5/2020 | Querze et al. | |
| 2020/0401539 A1 | 12/2020 | Kim | |
| 2021/0074309 A1 | 3/2021 | Dusan et al. | |
| 2021/0124772 A1 | 4/2021 | Jorgensen et al. | |
| 2021/0255710 A1 | 8/2021 | Fleizach et al. | |
| 2021/0329424 A1 | 10/2021 | Barzuza et al. | |

OTHER PUBLICATIONS

English Translation of CN 111107456 (Year: 2020).*

English Translation of WO 2020010579 (Year: 2020).*

European Extended Search Report and Opinion for European Application No. 22174173.9, dated Oct. 17, 2022, 7 pages.

European Search Report and Search Opinion Received for EP Application No. 21208463.6, dated on Apr. 29, 2022, 10 pages.

* cited by examiner

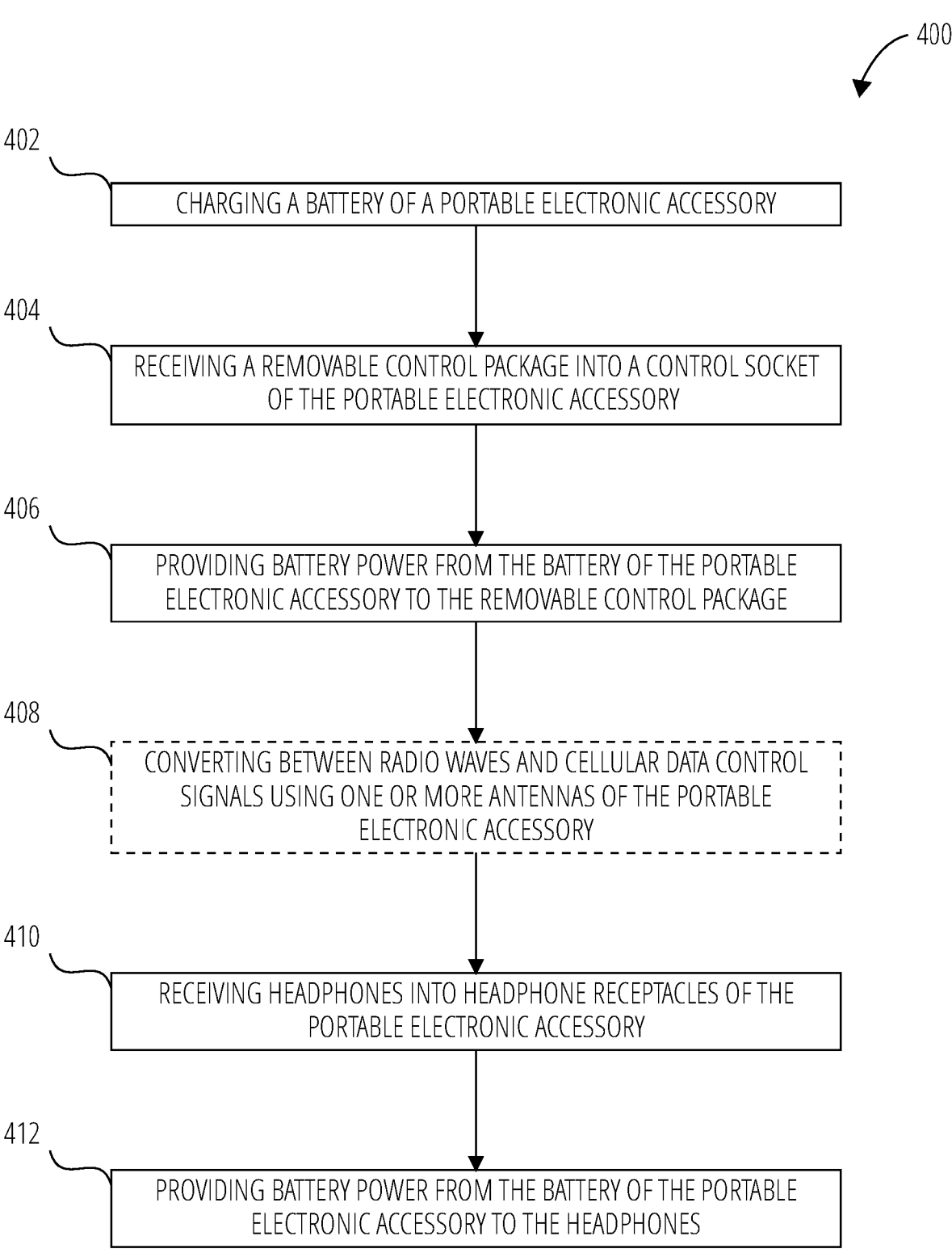

400

402 CHARGING A BATTERY OF A PORTABLE ELECTRONIC ACCESSORY

404 RECEIVING A REMOVABLE CONTROL PACKAGE INTO A CONTROL SOCKET OF THE PORTABLE ELECTRONIC ACCESSORY

406 PROVIDING BATTERY POWER FROM THE BATTERY OF THE PORTABLE ELECTRONIC ACCESSORY TO THE REMOVABLE CONTROL PACKAGE

408 CONVERTING BETWEEN RADIO WAVES AND CELLULAR DATA CONTROL SIGNALS USING ONE OR MORE ANTENNAS OF THE PORTABLE ELECTRONIC ACCESSORY

410 RECEIVING HEADPHONES INTO HEADPHONE RECEPTACLES OF THE PORTABLE ELECTRONIC ACCESSORY

412 PROVIDING BATTERY POWER FROM THE BATTERY OF THE PORTABLE ELECTRONIC ACCESSORY TO THE HEADPHONES

FIG. 4

PORTABLE ELECTRONIC ACCESSORY SYSTEMS AND RELATED DEVICES

TECHNICAL FIELD

This disclosure relates generally to portable electronic accessories that interface with removable control packages, and more specifically to truly wireless stereo (TWS) headphone cases including control sockets, and removable control packages that interface with the control sockets.

BACKGROUND

Truly wireless stereo (TWS) headphones have become a popular alternative to conventional wired headphones. TWS headphones allow the user to listen to music and podcasts, participate in two-way voice and video communications, and hear audio for videos without the inconveniences associated with wired headphones. TWS headphones are commonly sold with a TWS headphone case that is used to charge and store the TWS headphones.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

FIG. 4 is a flowchart illustrating a method of powering a portable electronic accessory system, according to some embodiments.

DETAILED DESCRIPTION

Figure 1:
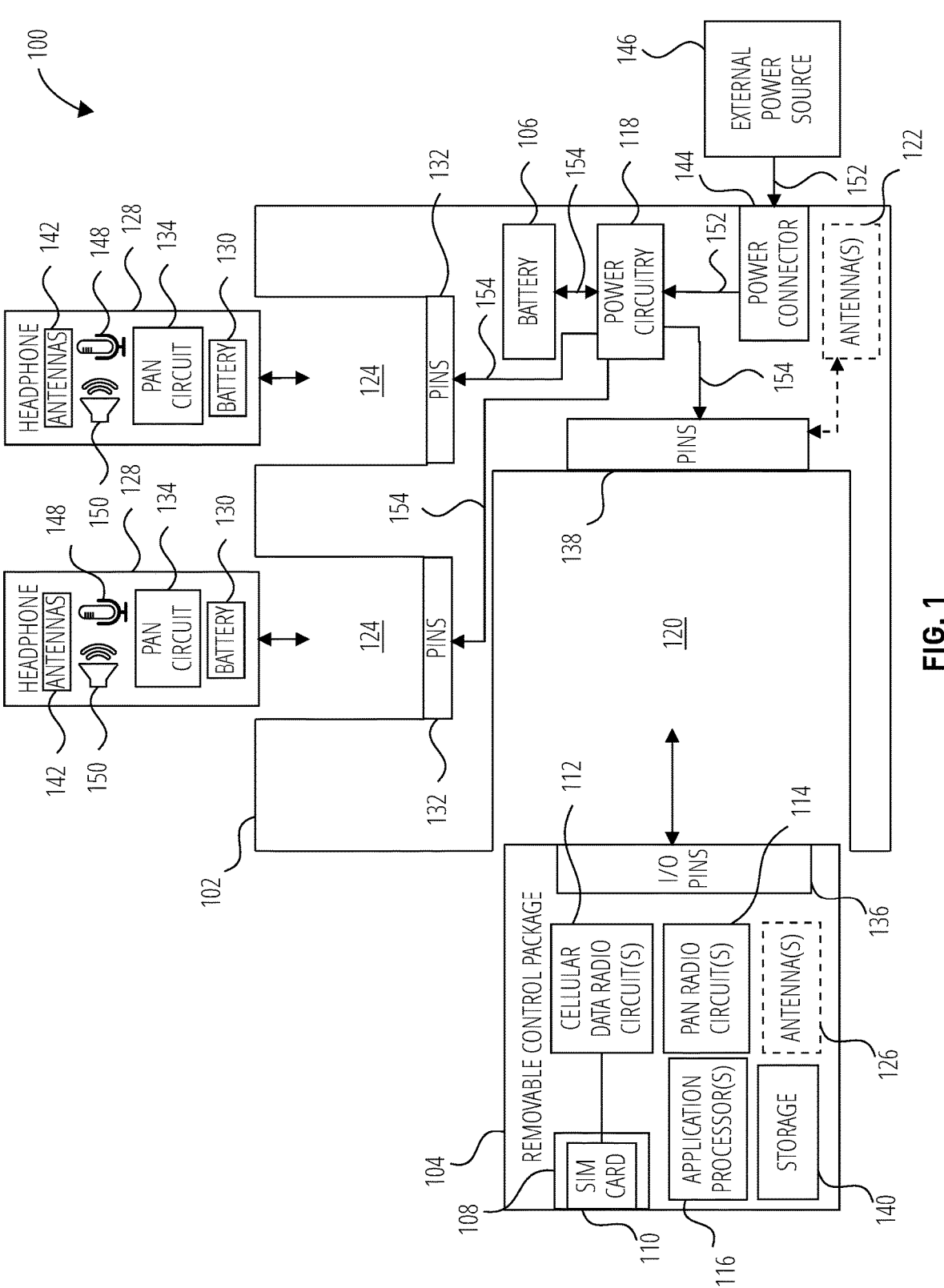
FIG. 1 is a block diagram of a portable electronic accessory system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

FIG. 1 is a block diagram of a portable electronic accessory system 100, according to some embodiments. The portable electronic accessory system 100 includes a portable electronic accessory 102 and a removable control package 104. The portable electronic accessory 102 includes a battery 106 configured to provide battery power 154 and a control socket 120 configured to receive the removable control package 104. The removable control package 104 is configured to control operation of the portable electronic accessory 102. The portable electronic accessory 102 also includes power circuitry 118 configured to deliver at least a portion of the battery power 154 to the removable control package 104 to power the removable control package 104.

The removable control package 104 also includes a power connector 144 configured to receive external power 152 from an external power source 146 and provide the external power 152 to the power circuitry 118. By way of non-limiting example, the external power source 146 may include an alternating current (AC) to direct current (DC) power converter configured to convert AC power from a plug to the external power 152 in the form of DC power. Also by way of non-limiting example, the external power source 146 may include a wireless power transmitter and the power connector 144 may include a wireless power receiver. The power circuitry 118 provides battery power 154 to the battery 106 responsive to the external power 152. The power circuitry 118 may also control charging of the battery 106 and distribution of the battery power 154 from the battery 106 to the removable control package 104.

In some embodiments the portable electronic accessory 102 is a truly wireless stereo (TWS) headphone case including headphone receptacles 124. The headphone receptacles 124 are configured to receive headphones 128 (e.g., TWS headphones) therein to store the headphones 128 in the TWS headphone case and charge headphone batteries 130 of the headphones 128 while the headphones 128 are received in the headphone receptacles 124. In some embodiments the headphone receptacles 124 include charging pins 132 therein. The charging pins 132 are configured to deliver charging power to the headphones 128 when the headphones 128 are received in the headphone receptacles 124. The power circuitry 118 may be configured to control delivery of the battery power 154 to the charging pins 132. The headphones 128 may store the charging power in the headphone batteries 130. The headphone batteries 130 are configured to power speakers 150 and microphones 148, and circuitry of the headphone 128. Although the portable electronic accessory 102 illustrated in FIG. 1 is a TWS headphone case, the disclosure is not so limited. For example, in some embodiments the portable electronic accessory 102 may be a watch (e.g., a smart watch), electronic glasses, or a speaker assembly (e.g., a wireless speaker).

In some embodiments the control socket 120 has a form factor of a secure digital (SD) card socket and the removable control package 104 has a form factor of an SD card. An SD card form factor may enable easy insertion and removal of the removable control package 104 from the control socket 120. The control socket 120 and the removable control package 104 may take other forms, however. For example, the control socket 120 and the removable control package 104 may instead reflect a CompactFlash form factor, a MultiMediaCard form factor, a Memory Stick form factor, or any other form factor. In some embodiments the control socket 120 is configured to completely house the removable control package 104. In some embodiments the control socket 120 is configured to at least partially house the removable control package 104.

The removable control package 104 includes input/output pins (I/O pins 136) configured to interface with control pins 138 of the control socket 120 of a portable electronic accessory 102. The control socket 120 is configured to removably receive the removable control package 104. The I/O pins 136 are configured to electrically connect to the control pins 138 of the control socket 120 when the removable control package 104 is received into the control socket 120. The I/O pins 136 are configured to receive battery power 154 from the battery 106 of the portable electronic accessory 102.

The removable control package 104 is configured to power circuitry of the removable control package 104 using the battery power 154 received through the I/O pins 136. For example, the removable control package 104 may include one or more communication radio circuits. By way of non-limiting examples, the communication radio circuits may include one or more cellular data radio circuits 112 (e.g., a fourth generation (4G) long-term evolution (LTE) radio circuit, a fifth generation (5G) radio circuit, etc.), and one or more PAN radio circuits 114 (e.g., a BLUETOOTH® radio circuit, a ZIGBEE® radio circuit, etc.). Also by way of non-limiting example, the cellular data radio circuits 112 may include one or more of a narrow-band internet of things (NB-IoT) radio circuit and an enhanced machine type communication (eMTC) long-term evolution (LTE-M) radio circuit.

The one or more communication radio circuits are configured to provide wireless communication capabilities to the portable electronic accessory 102. In embodiments where the cellular data radio circuits 112 include an NB-IoT radio circuit the cellular data radio circuits 112 may be capable of providing voice and data communications. In embodiments where the cellular data radio circuits 112 include an LTE-M radio circuit the cellular data radio circuits 112 may be capable of providing full music streaming capabilities to the cellular data radio circuits 112.

In embodiments where the removable control package 104 includes one or more cellular data radio circuits 112 the removable control package 104 may include a Subscriber Identity Module (SIM) card slot (SIM card slot 108) configured to receive a SIM card 110. The cellular data radio circuits 112 may use the SIM card slot 108 in cellular data operations.

In some embodiments one or more communication radio circuits of the removable control package 104 may be configured to communicate with one or more antennas 122 of the portable electronic accessory 102 through the I/O pins 136 and the control pins 138. In some embodiments the one or more antennas 122 may include a cellular data antenna (not shown) configured to interface with the one or more cellular data radio circuits 112 of the removable control package to enable the cellular data radio circuits 112 to communicate by way of a cellular data network (not shown). By way of non-limiting example, the one or more antennas 122 may include 4G LTE cellular data antenna. Also by way of non-limiting example, the one or more antennas 122 may include a 5G cellular data antenna. As another non-limiting example, the one or more antennas may include a narrowband internet of things (NB-IoT) antenna configured to interface with an NB-IoT radio circuit of the cellular data radio circuits 112. The NB-IoT antenna may be configured to enable the NB-IoT radio circuit to communicate by way an NB-IoT network. As a further non-limiting example, the one or more antennas may include an enhanced machine type communication (eMTC) long-term evolution (LTE-M) antenna configured to interface with an LTE-M radio circuit of the cellular data radio circuits 112. The LTE-M radio circuit is configured to enable the LTE-M radio circuit to communicate by way an NB-IoT network. As an even further non-limiting example, the one or more antennas 122 may include a wireless PAN (e.g., BLUETOOTH®, ZIG-BEE®, etc.) antenna configured to interface with a wireless PAN radio circuit of the PAN radio circuits 114. The wireless PAN antenna may enable the PAN radio circuits 114 to communicate with one or more PAN peripheral devices (e.g., the headphones 128). By way of non-limiting example, the headphones 128 may include antennas 142 and PAN peripheral circuits 134. The PAN peripheral circuits 134 may be configured to communicate with the PAN radio circuits 114 through the antennas 142 and the one or more antennas 122 or one or more antennas 126 (discussed in more detail below).

In some embodiments the removable control package 104 itself may include one or more antennas 126. The one or more antennas 126 may include any one or more of the one or more antennas 122 discussed above. As a result, in various embodiments all the antennas may be located in the removable control package 104, all of the antennas may be located in the portable electronic accessory 102, or the antennas may be distributed within both the removable control package 104 and the portable electronic accessory 102. Because of limited space on the removable control package 104, however, it may be convenient to provide most or all of the antennas in the one or more antennas 122 of the portable electronic accessory 102.

The removable control package 104 may further include one or more application processors 116 and one or more data storage devices 140 (e.g., serial Flash, psuedostatic dynamic random access memory (PSRAM), etc.). The data storage devices 140 are configured to store computer-readable instructions for an operating system (e.g., an audio operating system) and software applications (e.g., music software applications). The application processors 116 are configured to execute the computer-readable instructions stored by the data storage devices 140. An audio operating system may be used with truly wireless stereo (TWS) headphones 128 responsive to insertion of the removable control package 104 into the control socket 120, the portable electronic accessory comprising a TWS headphone case for the TWS headphones. The application processors 116 may be configured to execute one or more music software applications to provide music to the headphones 128 (e.g., via the PAN radio circuits 114). Although the application processors 116 is shown separately from the cellular data radio circuits 112 and the PAN radio circuits 114, in some embodiments the application processors 116 may be implemented on the cellular data radio circuits 112 or the PAN radio circuits 114. As a specific non-limiting example the application processors 116 may be implemented on one or more PAN radio circuits 114 including a BLUETOOTH® radio circuit such as on an Airoha AB1552A BLUETOOTH® system on chip (SoC). The data storage devices 140 may also be configured to store audio data (e.g., music, podcasts, etc.), which may be provided to the headphones 128 via the PAN radio circuits 114 and the PAN peripheral circuits 134.

In operation, the removable control package 104 may be inserted into the control socket 120. As a result, the removable control package 104 may be powered by battery power 154 delivered to the removable control package 104 (e.g., via the control pins 138 and the I/O pins 136). If the headphones 128 are removed from the headphone receptacle 124 (e.g., worn by a user) the PAN radio circuits 114 of the removable control package 104 may communicate with the PAN peripheral circuits 134 of the headphones 128 (e.g., through the one or more antennas 122 or the one or more antennas 126 and the antennas 142). As a result the application processors 116 may provide and receive audio elements (e.g., audio commands received through the microphones 148, button or touch inputs received through buttons or touch sensors of the headphones 128, etc.) for an audio operating system to and from the headphones 128 via the PAN radio circuits 114, which is in communication with the PAN peripheral circuits 134 of the headphone 128. The cellular data radio circuits 112 may provide an Internet connection (e.g., via the one or more antennas 122 or the one or more antennas 126), which may be utilized by the operating system to provide network resources.

By way of non-limiting example, audio (e.g., music, podcasts, etc.) may be streamed to the speakers 150 of the headphone 128 using a multi-media software application (e.g., a music software application, a podcast software application, etc.) executed by the application processors 116. The audio may be provided by a content provider through the Internet. The one or more antennas 122 or the one or more antennas 126 may receive the audio from the Internet and provide the audio to the cellular data radio circuits 112. The application processors 116 may control the PAN radio circuits 114 to provide the audio to the PAN peripheral circuits 134 of the headphones 128 (e.g., by providing the audio to the one or more antennas 122, which may provide the audio to the antennas 142 of the headphones 128).

Also by way of non-limiting example, two-way voice communication may be enabled. For example, the microphones 148 may capture voice data corresponding to acoustic waves in proximity to the microphones 148, and provide the voice data to the PAN peripheral circuits 134. The PAN peripheral circuits 134 may transmit the voice data, using the antennas 142, to the one or more antennas 122 or the one or more antennas 126, which may provide the voice data to the PAN radio circuits 114. The cellular data radio circuits 112 may then transmit the voice data over the Internet via the one or more antennas 122 or the one or more antennas 126. The cellular data radio circuits 112 may also receive received voice data transmitted to the cellular data radio circuits 112 via the one or more antennas 122 or the one or more antennas 126 through the Internet. The PAN radio circuits 114 may forward the received voice data to the PAN peripheral circuits 134 via the one or more antennas 122 or the one or more antennas 126, and the PAN peripheral circuit 134 may provide the received voice data to the speakers 150, which may convert the received voice data to acoustic waves. In this way, a user may engage in two-way voice communications using the portable electronic accessory system 100.

As a further non-limiting example, the application processors 116 may provide an audio user interface via the headphones. For example, audio messages corresponding to menu options may be stored in the data storage devices 140, and the audio messages may be provided to the headphones 128 for presentation to the user using the speakers 150 via the PAN radio circuits 114 and the PAN peripheral circuits 134. User selections, other verbal commands, and/or button selections of buttons on the headphones 128 and/or on the portable electronic accessory 102 may be received at the application processors 116 (e.g., through the PAN peripheral circuits 134 and the PAN radio circuits 114 or via the control pins 138 and the I/O pins 136).

Examples of software applications that may be stored by the data storage devices 140 and executed by the application processors 116 may include a voice interface software application, online shopping software applications, search engine software applications, web browser software applications, music streaming software applications, cloud connection software applications, a settings software application, a software application store software application, a music sharing software application, other software applications, or combinations thereof.

It is contemplated herein that the control socket 120 is configured to receive various different removable control packages. For example, when a user is desirous to upgrade functional features of the removable control package 104, the user may simply remove the removable control package 104 and replace the removable control package 104 with a different removable control package having upgraded capabilities. In a similar way a faulty removable control package may be removed from the control socket 120 and replaced with a functional removable control package to enable replacement of the electronics of the removable control package without the need to replace the portable electronic accessory 102. Furthermore, the portable electronic accessory 102 may be replaced without the need to replace the removable control package 104 because the removable control package 104 may be removed from the portable electronic accessory 102 and placed into a new portable electronic accessory. Also, a user may use the removable control package 104 with various different portable electronic accessories. For example, the user may remove the removable control package 104 from the control socket 120 of the portable electronic accessory 102 and insert the removable control package 104 into a different portable electronic accessory (e.g., another TWS headphone case, a smart watch, electronic glasses, etc.). As a result, a single removable control package 104 may be used in conjunction with several different portable electronic devices without the need for expensive control circuitry in each of the portable electronic devices.

Figure 2:
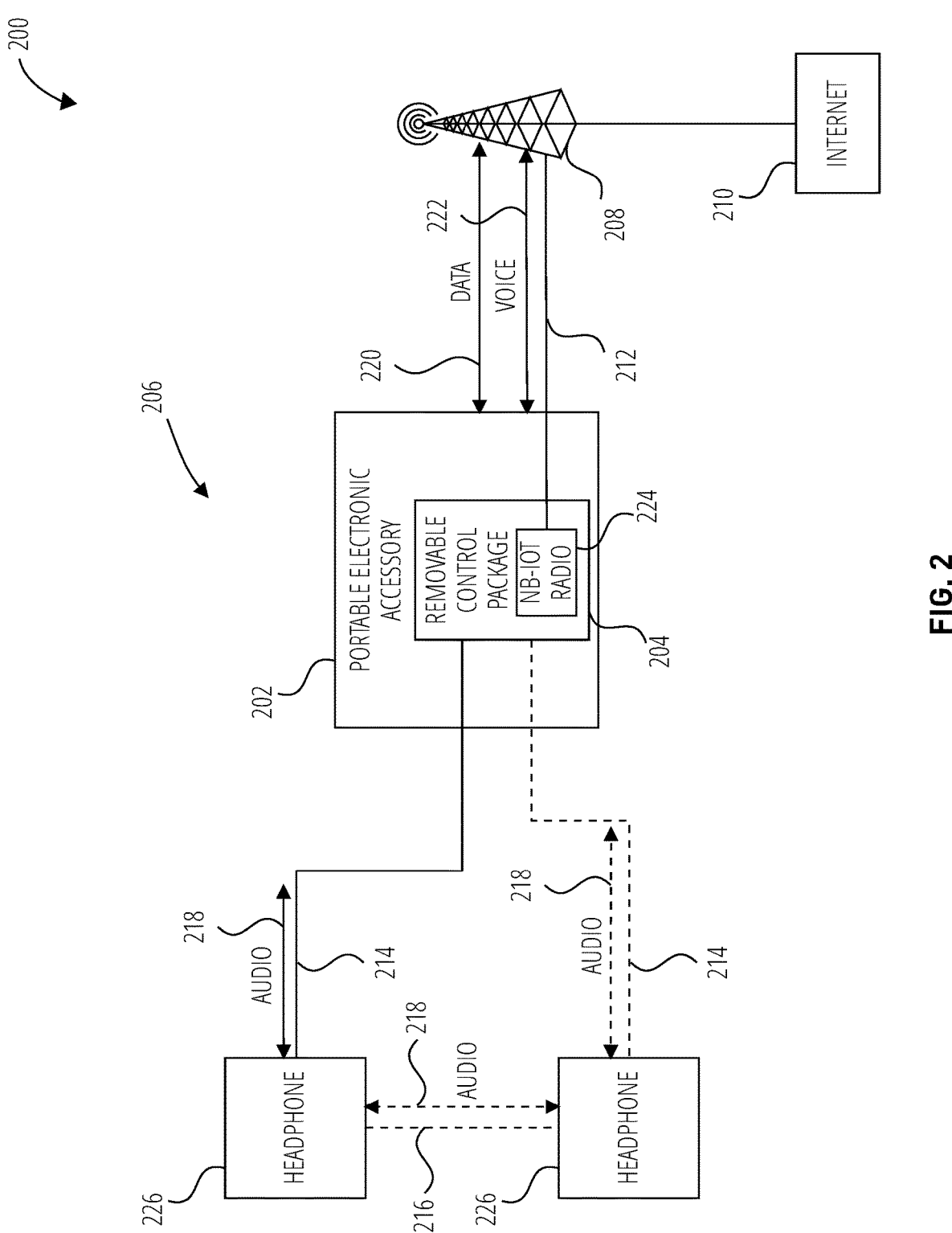
FIG. 2 is a block diagram of a narrow-band internet of things (NB-IoT) system, according to some embodiments.

FIG. 2 is a block diagram of an NB-IoT system 200, according to some embodiments. The NB-IoT system 200 includes a portable electronic accessory system 206, which is an example of the portable electronic accessory system 100 of FIG. 1. The NB-IoT system 200 also includes a cellular base station 208, which is connected to the Internet 210.

The portable electronic accessory system 206 includes a portable electronic accessory 202, a removable control package 204 inserted into the portable electronic accessory 202, and headphones 226, which are similar to the portable electronic accessory 102, the removable control package 104, and the headphones 128 discussed above with reference to FIG. 1. The portable electronic accessory 302 may be a TWS headphone case. The removable control package 204 is configured to connect to the headphones 226 via a wireless PAN network 214 (e.g., BLUETOOTH®) to enable communication of audio 218 between the removable control package 204 and the headphones 226. One of the wireless PAN network 214 lines shown in FIG. 2 is illustrated using broken lines because in some embodiments only one of the headphone 226 may communicate directly with the removable control package 204. In such embodiments a wireless PAN network 216 between the headphones 226 may be used to route the audio 218 between the removable control package 204 and the other one of the headphones 226 that is not directly connected to the removable control package 204 by the wireless PAN network 214. In some embodiments, however, both of the headphone 226 may be directly connected to the removable control package 204 using the wireless PAN network 214.

The removable control package 204 includes an NB-IoT radio 224, which is an example of the cellular data radio circuits 112 of FIG. 1. The NB-IoT radio 224 may enable the removable control package 204 to connect to the cellular base station 208 via a wireless NB-IoT network 212, which is capable of enabling bidirectional voice 220 and data 222 communications between the removable control package 204 and the cellular base station 208. The data 222 may provide the removable control package 204 with access to the Internet 210 via the wireless NB-IoT network 212. By way of non-limiting examples, the wireless NB-IoT network 212 may be provided according to 4G LTE protocols or 5G protocols.

Figure 3:
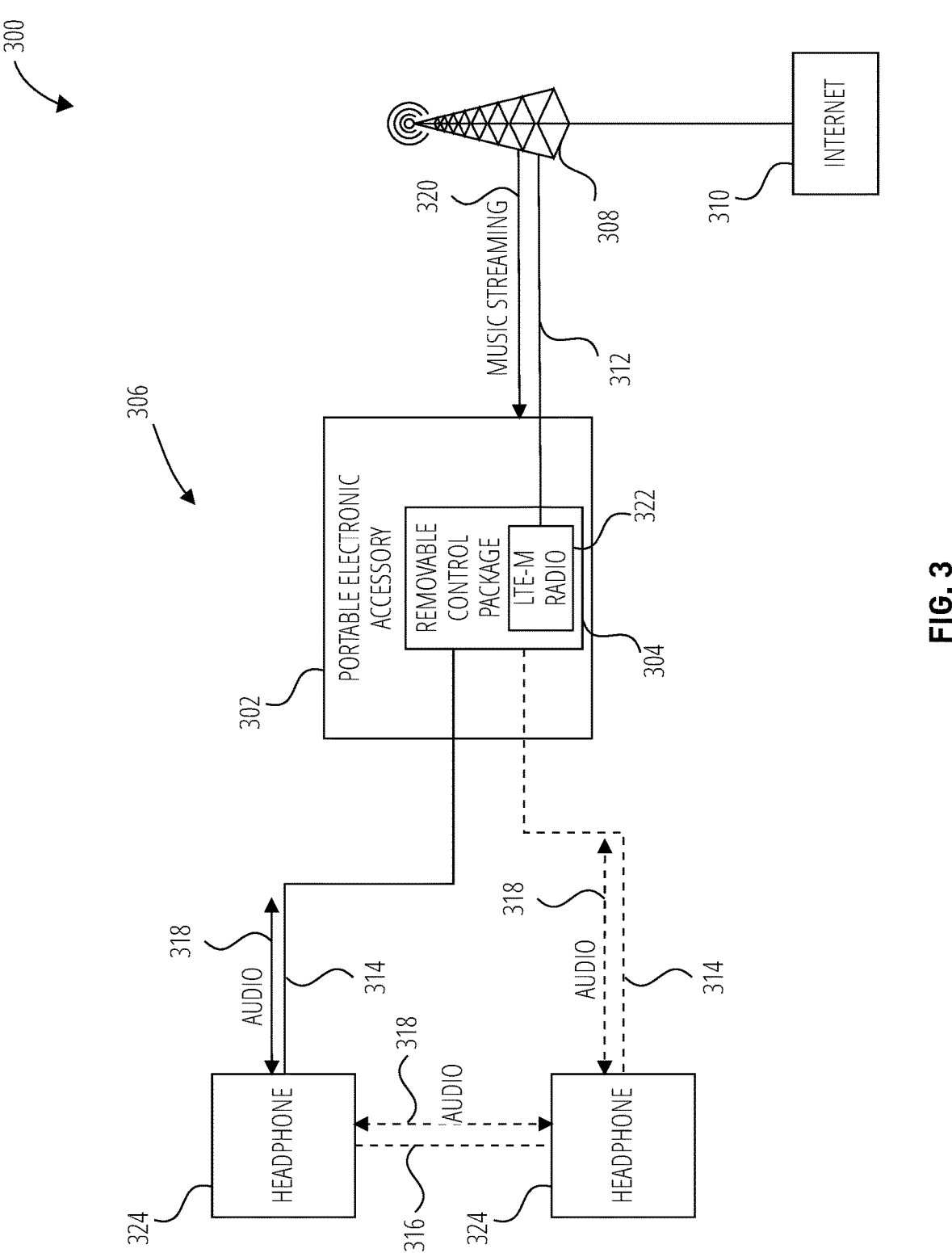
FIG. 3 is a block diagram of an enhanced machine type communication (eMTC) long-term evolution (LTE-M) system, according to some embodiments.

FIG. 3 is a block diagram of an LTE-M system 300, according to some embodiments. The LTE-M system 300 includes a portable electronic accessory system 306, which is an example of the portable electronic accessory system 100 of FIG. 1. The LTE-M system 300 also includes a cellular base station 308, which is connected to the Internet 310.

The portable electronic accessory system 306 includes a portable electronic accessory 302, a removable control package 304 inserted into the portable electronic accessory 302, and headphones 324, which are similar to the portable electronic accessory 102, the removable control package 104, and the headphones 128 discussed above with reference to FIG. 1. The portable electronic accessory 302 may be a TWS headphone case. Similar to the removable control package 204 discussed above with reference to FIG. 2, the removable control package 304 is configured to connect to the headphones 324 via a wireless PAN network 314 (e.g., BLUETOOTH®) to enable communication of audio 318 between the removable control package 304 and the headphones 324. The headphones 324, the wireless PAN network 314, and the wireless PAN network 316 may be similar to the headphone 226, the wireless PAN network 214, and the wireless PAN network 216 discussed above with reference to FIG. 2.

The removable control package 304 includes an LTE-M radio 322, which is an example of the cellular data radio circuits 112 of FIG. 1. The LTE-M radio 322 may enable the removable control package 304 to connect to the cellular base station 308 via an LTE-M network 312, which is capable of enabling music streaming 320 to the removable control package 304, and by extension, to the headphones 324. The LTE-M network 312 may also be capable of enabling bidirectional voice 220 and data 222 communications, as shown in FIG. 2 (although not shown in FIG. 3 for simplicity) between the removable control package 304 and the cellular base station 308.

The LTE-M network 312 may be a relatively more broadband network connection than the wireless NB-IoT network 212 of FIG. 2. Accordingly, the LTE-M system 300 may be capable of providing music streaming 320 where it may be difficult or impossible to provide music streaming in the NB-IoT system 200 of FIG. 2. It is noted that the removable control package 304 may be removed from the portable electronic accessory 302 and inserted into the portable electronic accessory 202 of FIG. 2 to provide the portable electronic accessory 202 (and by extension the headphones 226) music streaming capabilities.

FIG. 4 is a flowchart illustrating a method 400 of powering a portable electronic accessory system, according to some embodiments. At operation 402 the method 400 includes charging a battery of a portable electronic accessory. In some embodiments charging the battery may include plugging an external power source into a power connector of the portable electronic accessory. In some embodiments charging the battery may include placing the portable electronic accessory into proximity of a wireless power transmitter (e.g., placing the portable electronic accessory onto a charging pad).

At operation 404 the method 400 includes receiving a removable control package into a control socket of the portable electronic accessory. In some embodiments receiving the removable control package into the control socket includes receiving a removable control package having a form factor of an SD card into an SD card socket. At operation 406 the method 400 includes providing battery power from the battery of the portable electronic accessory to the removable control package.

At operation 408 the method 400 includes converting between radio waves and cellular data control signals using one or more antennas of the portable electronic accessory. For example, the portable electronic accessory may optionally include one or more antennas to enable wireless communication radio circuits of the removable control package to communicate wirelessly. In some embodiments, however, the removable control package itself may include one or more antennas configured to enable the wireless communication radio circuits to communicate wirelessly.

At operation 410 the method 400 includes receiving headphones into headphone receptacles of the portable electronic accessory. As previously discussed, the portable electronic accessory may include a TWS headphone case, which includes headphone receptacles configured to receive TWS headphones. At operation 412 the method 400 includes providing battery power from the battery of the portable electronic accessory to the headphones. In some embodiments providing the battery power to the headphones includes providing the battery power to charging pins in the headphone receptacles.

Figure 5:
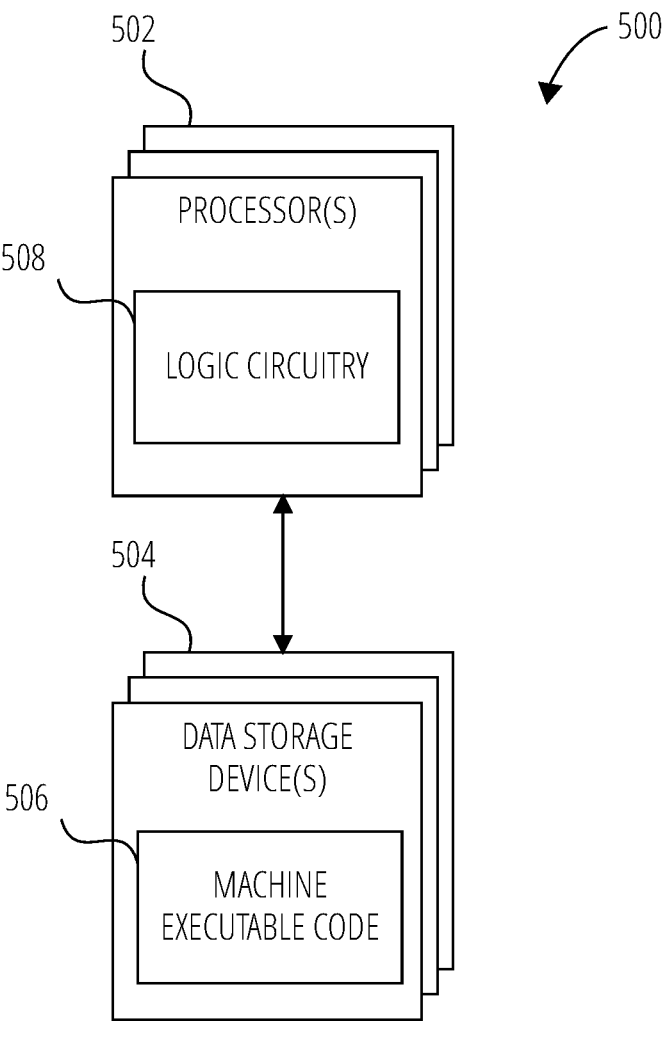
FIG. 5 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 5 illustrates non-limiting examples of implementations of functional elements disclosed herein. In some embodiments, some or all portions of the functional elements disclosed herein may be performed by hardware specially configured for carrying out the functional elements.

FIG. 5 is a block diagram of circuitry 500 that, in some embodiments, may be used to implement various functions, operations, acts, processes, and/or methods disclosed herein. The circuitry 500 includes one or more processors 502 (sometimes referred to herein as "processors 502") operably coupled to one or more data storage devices (sometimes referred to herein as "storage 504"). The storage 504 includes machine executable code 506 stored thereon and the processors 502 include logic circuitry 508. The machine executable code 506 includes information describing functional elements that may be implemented by (e.g., performed by) the logic circuitry 508. The logic circuitry 508 is adapted to implement (e.g., perform) the functional elements described by the machine executable code 506. The circuitry 500, when executing the functional elements described by the machine executable code 506, should be considered as special purpose hardware configured for carrying out functional elements disclosed herein. In some embodiments the processors 502 may be configured to perform the functional elements described by the machine executable code 506 sequentially, concurrently (e.g., on one or more different hardware platforms), or in one or more parallel process streams.

When implemented by logic circuitry 508 of the processors 502, the machine executable code 506 is configured to adapt the processors 502 to perform operations of embodiments disclosed herein. For example, the machine executable code 506 may be configured to adapt the processors 502 to perform at least a portion of the method 400 of FIG. 4. As another example, the machine executable code 506 may be configured to adapt the processors 502 to perform at least a portion or a totality of the operations discussed for the application processors 116 of FIG. 1, the cellular data radio circuits 112 of FIG. 1, the PAN radio circuits 114 of FIG. 1, the PAN peripheral circuits 134 of FIG. 1, the power circuitry 118 of FIG. 1, the removable control package 204 of FIG. 2, the NB-IoT radio 224 of FIG. 2, the removable control package 304 of FIG. 3, and/or the LTE-M radio 322 of FIG. 3.

The processors 502 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 506 (e.g., software code, firmware code, hardware descriptions) related to embodiments of the present disclosure. It is noted that a general-purpose processor (may also be referred to herein as a host processor or simply a host) may be a microprocessor, but in the alternative, the processors 502 may include any conventional processor, controller, microcontroller, or state machine. The processors 502 may also be implemented as a combination of computing devices, such as a combination of a DSP and a microprocessor, a plurality of microprocessors, one or more microprocessors in conjunction with a DSP core, or any other such configuration.

In some embodiments the storage 504 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 502 and the storage 504 may be implemented into a single device (e.g., a semiconductor device product, a system on chip (SOC), etc.). In some embodiments the processors 502 and the storage 504 may be implemented into separate devices.

In some embodiments the machine executable code 506 may include computer-readable instructions (e.g., software code, firmware code). By way of non-limiting example, the computer-readable instructions may be stored by the storage 504, accessed directly by the processors 502, and executed by the processors 502 using at least the logic circuitry 508. Also by way of non-limiting example, the computer-readable instructions may be stored on the storage 504, transferred to a memory device (not shown) for execution, and executed by the processors 502 using at least the logic circuitry 508. Accordingly, in some embodiments the logic circuitry 508 includes electrically configurable logic circuitry 508.

In some embodiments the machine executable code 506 may describe hardware (e.g., circuitry) to be implemented in the logic circuitry 508 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 508 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 506 may include an HDL, an RTL, a GL description, a mask level description, other hardware description, or any combination thereof.

In embodiments where the machine executable code 506 includes a hardware description (at any level of abstraction), a system (not shown, but including the storage 504) may be configured to implement the hardware description described by the machine executable code 506. By way of non-limiting example, the processors 502 may include a programmable logic device (e.g., an FPGA or a PLC) and the logic circuitry 508 may be electrically controlled to implement circuitry corresponding to the hardware description into the logic circuitry 508. Also by way of non-limiting example, the logic circuitry 508 may include hard-wired logic manufactured by a manufacturing system (not shown, but including the storage 504) according to the hardware description of the machine executable code 506.

Regardless of whether the machine executable code 506 includes computer-readable instructions or a hardware description, the logic circuitry 508 is adapted to perform the functional elements described by the machine executable code 506 when implementing the functional elements of the machine executable code 506. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A portable electronic accessory, comprising:
a battery configured to provide battery power;
a control socket configured to receive a removable control package, the removable control package comprising:
one or more data storage devices storing an audio operating system;
one or more radio circuits configured to wirelessly communicate with truly wireless stereo (TWS) headphones, the TWS headphones being separate from the portable electronic accessory and the removable control package;
one or more application processors configured to execute the audio operating system to provide, via the one or more radio circuits, one or more audio elements to the TWS headphones responsive to receiving one or more control signals from the TWS headphones; and
power circuitry configured to deliver at least a portion of the battery power to the removable control package to power the removable control package.

2. The portable electronic accessory of claim 1, wherein the portable electronic accessory is a truly wireless stereo headphone case including headphone receptacles, the headphone receptacles configured to receive the TWS headphones therein to store the TWS headphones in the TWS headphone case and charge headphone batteries of the TWS headphones while the TWS headphones are received in the headphone receptacles.

3. The portable electronic accessory of claim 2, wherein the headphone receptacles include charging pins therein, the charging pins configured to deliver charging power to the TWS headphones when the TWS headphones are received in the headphone receptacles.

4. The portable electronic accessory of claim 1, wherein the portable electronic accessory is a device selected from the group consisting of a watch, electronic glasses, and a wireless speaker.

5. The portable electronic accessory of claim 1, wherein the control socket has a form factor of a secure digital (SD) card socket to receive a removable control package having a form factor of an SD card.

6. The portable electronic accessory of claim 1, further comprising one or more antennas configured to interface with one or more communication radio circuits of the removable control package.

7. The portable electronic accessory of claim 6, wherein the one or more antennas include a cellular data antenna configured to interface with a cellular data radio circuit of the removable control package to enable the cellular data radio circuit to communicate by way of a cellular data network.

8. The portable electronic accessory of claim 6, wherein the one or more antennas include a wireless personal area network (PAN) antenna configured to interface with a wireless PAN radio circuit of the removable control package to enable the PAN radio circuit to communicate with a PAN peripheral device.

9. The portable electronic accessory of claim 8, wherein the PAN peripheral device includes one or more truly wireless stereo (TWS) headphones.

10. A removable control package, comprising:
input/output pins configured to interface with pins of a control socket of a portable electronic accessory, the control socket configured to removably receive the removable control package, the input/output pins configured to electrically connect to the pins of the control socket when the removable control package is received into the control socket, the input/output pins configured to receive battery power from a battery of the portable electronic accessory;
one or more storage devices storing an audio operating system for use with truly wireless stereo (TWS) headphones, the TWS headphones being separate from the portable electronic accessory and the removable control package;
an application processor configured to execute the audio operating system responsive to insertion of the removable control package into the control socket, the portable electronic accessory comprising a TWS headphone case for the TWS headphones; and
one or more communication radio circuits configured to provide wireless communication capabilities to the portable electronic accessory.

11. The removable control package of claim 10, wherein the one or more communication radio circuits are configured to electrically connect, through the input/output pins, to one or more antennas of the portable electronic accessory.

12. The removable control package of claim 10, wherein the one or more communication radio circuits comprise a cellular data radio circuit.

13. The removable control package of claim 12, wherein the cellular data radio circuit comprises one or more of a narrow-band internet of things (NB-IoT) radio circuit and an enhanced machine type communication (eMTC) long-term evolution (LTE-M) radio circuit.

14. The removable control package of claim 12, wherein the cellular data radio circuit is configured to enable cellular voice communications for headphones of the portable electronic accessory.

15. The removable control package of claim 12, wherein the cellular data radio circuit is configured to enable music streaming over the Internet for headphones of the portable electronic accessory.

16. The removable control package of claim 10, wherein the one or more communication radio circuits comprise a personal area network (PAN) radio circuit.

17. The removable control package of claim 10, further comprising a Subscriber Identity Module (SIM) card slot configured to receive a SIM card.

18. The removable control package of claim 10, wherein the application processor is further configured to execute one or more music software applications to provide music to the TWS headphones.

19. The removable control package of claim 10, wherein the removable control package has a form factor of a secure digital (SD) card.

\* \* \* \* \*